United States Patent [19]

Horton

[11] 4,395,095

[45] Jul. 26, 1983

[54] OPTICAL SYSTEM FOR INFRARED TRACKING

[75] Inventor: Richard F. Horton, Dunkirk, Md.

[73] Assignee: The United States of America as represented by the Secretary of the Navy, Washington, D.C.

[21] Appl. No.: 265,273

[22] Filed: May 20, 1981

[51] Int. Cl.³ .................... G02B 17/06; G02B 23/06
[52] U.S. Cl. .................................. 350/504; 350/505; 350/567
[58] Field of Search ............... 350/504, 505, 567, 568, 350/294; 353/3; 350/500, 1.2

[56] References Cited

U.S. PATENT DOCUMENTS 4,139,286  2/1979  Hein et al. ...................... 353/3

FOREIGN PATENT DOCUMENTS 1552139  11/1968  France .......................... 350/505

OTHER PUBLICATIONS

Doschek; George et al., *Sky and Telescope*, Jul. 1961, pp. 47–52.

*Primary Examiner*—Jon W. Henry
*Attorney, Agent, or Firm*—Robert F. Beers; William T. Ellis; Kenneth E. Walden

[57] ABSTRACT

An optical relay system for bringing a Cassegrain-type or other type telescope infrared (IR) image through a mount elevation axis, yoke and azimuth axis for focusing at an image plane on the mount which is stationary relative to compound motion of the telescope. The relay system is made up or of deflecting or folding mirrors, apertured flat mirrors and concave spherical and elliptical mirrors arranged for minizing field degradation of off-axis objects.

5 Claims, 2 Drawing Figures

OPTICAL SYSTEM FOR INFRARED TRACKING

BACKGROUND OF THE INVENTION

Coude systems are used with astronomical telescopes to provide a stationary image separate from the moving parts of the telescope mount. These systems typically are of very high "f" numbers, small field of view and do not allow for a wide range of focus for various object distances.

SUMMARY OF THE INVENTION

The invention is provided in a relay system for guiding an IR image such as that produce by a Cassegrain-type telescope through the mounts elevations axis yoke and azimuth axis for focusing at an image plane on the base of the mount which is stationary relative to compound telescope movement on the plural axis. The system is made up of apertured flat mirrors, concave mirrors and flat mirrors for folding the beam and focusing it at the fixed image plane regardless of movement or position of the telescope. By selecting the conic constants of the concave mirrors, aberrations in the orginal field caused by off-axis focusing have been reduced at the image plane.

OBJECT OF THE INVENTION

It is therefore an object of the invention to provide an optical relay system for transmitting reflecting-type telescope IR images through the mount's elevation axis, yoke and azimuth axis to a stationary focal plane in an accesible position.

It is another object of the invention to provide improved imaging for off-axis objects in the peripheral view of a reflecting telescope.

It is still another object of the invention to provide a relay system of folding mirrors, elliptical and spherical concave mirrors for enhancing focusing at various object distances.

Other objects of the invention will become apparent to one upon consideration the specification and claims in conjunction with the drawings annexed hereto.

DETAILED DESCRIPTION

Figure 1:
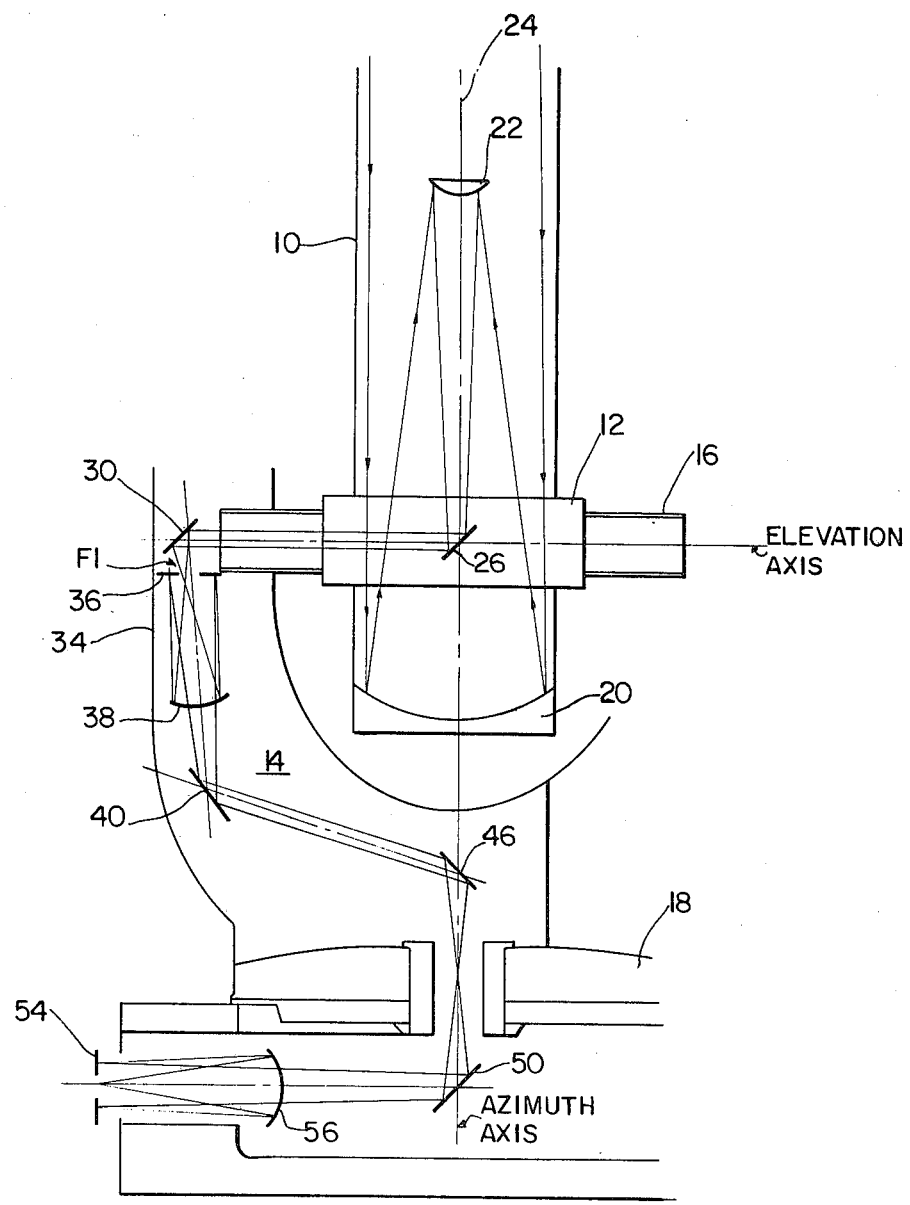
FIG. 1 is a cross-sectional representation of a telescope mount with an optical relay system conveying a telescope image therethrough to a fixed focal plane.

Referring now to the drawings there is shown in FIG. 1 a cross-sectional representation of a telescope mount with an optical relay system therein for conveying a reflecting telescope image from the telescope to a fixed focal plane located in the base of the mount. Within this relay system are provided a plurality of flat mirrors, apertured flat mirrors and concave mirrors (spherical and ellipsoidal) which fold the telescope produced image through the mount and rotary joints and at the same time minimize aberrations in the focal plane inherent in focusing of off-axis objects.

In FIG. 1 a telescope 10 is illustrated as carried by a trunnion ring 12 pivotally mounted on yoke 14 which is adapted for pivotal movement about shaft 16 defining an elevation axis. The yoke in turn is mounted on a base 18 and is adapted to swing or pivot about a vertical axis defined as the azimuth axis.

Figure 2:
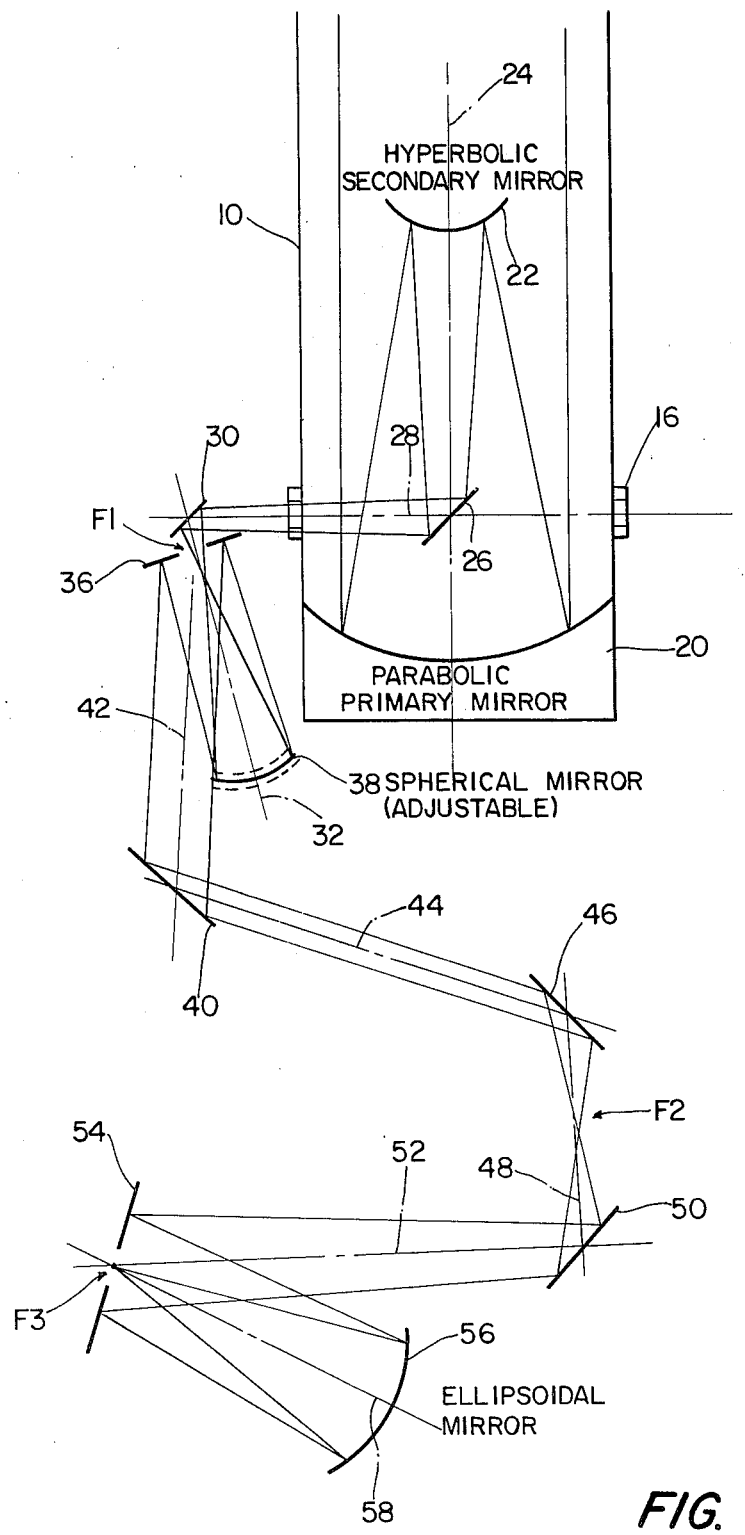
FIG. 2 is a diagrammatic representation of the optical relay system provided in the telescope mount according to the invention.

Telescope 10, illustrated as a Cassegrain-type telescope, but may preferably include other types, is shown in FIG. 1 as mounted on a trunnion ring for movement about the elevation axis. Reference should be made to the diagrammatic representation in FIG. 2 which more accurately folds the telescope image through the mount in the manner according to the invention. Assuming an object at some "object distance", light from the object enters the telescope system striking parabolic mirror 20, from which it reflects as a bundle or beam of rays. The telescope's primary mirror 20 and secondary mirror 22 (hyperbolic) face each other along optic axis 24 and produce an image which is folded by first turning flat mirror 26 fixed relative to axis 24 to direct the image along optic axis 28 (see FIG. 2 in particular) substantially at a right angle thereto and coaxially through the cylindrical opening of shaft 16 where it is intercepted by a second turning flat mirror 30 disposed at an oblique angle to optic axis 28. This mirror folds the bundle along optic axis 32 down arm 34 of yoke 14. The bundle is focused at a first focal point (F1) shortly down beam of second turning flat mirror 30. A first aperatured flat mirror 36 (illustrated only in FIG. 2) is disposed concentric with the bundle which has an axis 32 and at an oblique angle thereto and containing the region around focal point F1 in its plane. The aperature in flat 36 matches the shadow of the Cassegrain secondary 22 in the light bundle coming from mirror 38, thereby allowing for the greatest field diameter without loss of light. A spherical concave mirror 38, (illustrated only in FIG. 2) located down beam of turning flat mirror 36, intercepts the now diverging bundle and reflects it back to the first aperatured flat mirror 36 where it is again folded and directed toward third turning flat mirror 40 in arm 34 along optic axis 42. There it is once again folded and redirected generally laterally along optic axis 44 to a fourth turning flat 46 disposed centrally of the azimuth axis. Folding flat mirror 46 folds the bundle generally vertically downwardly through open pivot joints along optic axis 48 to a fifth turning flat mirror 50, also disposed centrally of the azimuth axis. A focal point F2 is formed between turning flats 46 and 50. The bundle of light in focal region F2 is of a local minimum diameter allowing the light to pass through a reduced diameter along the azimuth bearing axis. From turning flat 50 the bundle of light path is once again folded in a generally lateral direction along optic axis 52 where it reaches a second aperatured flat mirror 54. From this aperatured flat mirror the bundle is reflected back along optic axis 58 (illustrated in FIG. 2 only) onto ellipsoidal concave mirror 56 located downstream of and facing second aperatured flat mirror 54. The ellipsoidal concave mirror has its optic axis disposed coincident with optic axis 58 and its curvature is such that it reflects the light bundle back toward aperatured flat 54 and converges it to a focus F3 at the aperture opening in a plane of the aperatured flat mirror 54 which defines the focal plane. This plane is located at a fixed location on base 18 of the mount.

Regardless of the elevation or azimuth bearing of the telescope, its image is optically relayed through the articulated joints in the mount to the fixed optical focal plane.

Spherical concave mirror 38 is adapted for adjustment along its optic axis (see the dotted position in FIG. 2) for focusing the image F3 in the plane of second apertured flat mirror 54. By this arrangement the image formed at the focal plane in base 18 remains fixed for all positions and focus of telescope 10.

A reflecting telescope having a parabolic mirror provides zero aberrations for an object at infinity and on axis. Such a mirror does not, however, form a perfect a image for objects off the optic axis.

Normally, the field produced by a telescope such as by a Cassegrain telescope with a paraboloid primary mirror and a hyperboloid secondary mirror provides a field in sharp focus the center for on axis objects, but degrades for off-axis objects. While a good central field is desired, it may be useful under certain conditions to sacrifice sharpness of a central field in favor of an improved peripheral field of considerable area for off-axis objects. This invention provides a tradeoff by intentionally sacrificing a sharp central field in favor of the much larger and improved peripheral field for off-axis objects. An improved field is provided by the concave mirror arrangement with less coma or distortion for objects off the axis, i.e. improved field.

The invention provides for improved focusing of off-axis objects by the use of the spherical and ellipsoidal mirrors.

While the invention has been particularly shown and described with reference to specific embodiments thereof it will be understood by those skilled in the art that various changes in form and detail may be made therein without departing from the spirit of the invention which is limited only by the scope of the claims annexed thereto.

What is claimed is:

1. An optical system for relaying a telescope image from a movable telescope by folding the bundle through a movable telescope mount to a fixed focal plane remote therefrom with improved imaging for off axis focusing comprising:

means folding the bundle out of the telescope optical axis and converging it to a focal point outside the telescope;

a first apertured flat mirror disposed around the bundle axis with its plane at an oblique angle thereto and containing the focal point;

a spherical concave mirror downbeam of an facing the first apertured flat mirror for folding the bundle back to the apertured flat mirror from which it is folded to a second apertured flat mirror;

said second aperatured flat mirror disposed around the bundle axis with its plane at an oblique angle thereto and folding the bundle to an ellipsoidal concave mirror;

said ellipsoidal concave mirror disposed downbeam of an facing the second apertured flat mirror for folding the bundle back to the second apertured flat mirror and converging it to focal points in the aperature thereof in the plane of the second aperture flat mirror;

whereby aberrations caused by off-axis focusing of objects by the telescope are minimized in the periphery of the field at the focal plane.

2. The invention according to claim 1 wherein the second apertured flat mirror is fixed and defines the fixed focal plane.

3. The invention acording to claim 1 or 2 wherein the spherical mirror is adapted for adjustment along its optic axis for focusing the image at the focal plane defined by the plane of the second apertured flat mirror.

4. The invention according to claim 1 wherein the bundle folded by the first apertured flat mirror is converged to a focal point downbeam thereof and thereafter diverges toward the second apertured flat mirror.

5. The invention according to claim 1 or 2 further defined by plural flat reflectors folding the telescope bundle from the telescope through the movable mount to the fixed focal plane.

* * * * *